March 13, 1945.   R. LUTHI   2,371,177
FEEDING DEVICE
Filed Dec. 1, 1942   3 Sheets-Sheet 1

INVENTOR.
Robert Luthi
BY Ivan D. Thornburgh
Charles H. Erne
ATTORNEYS

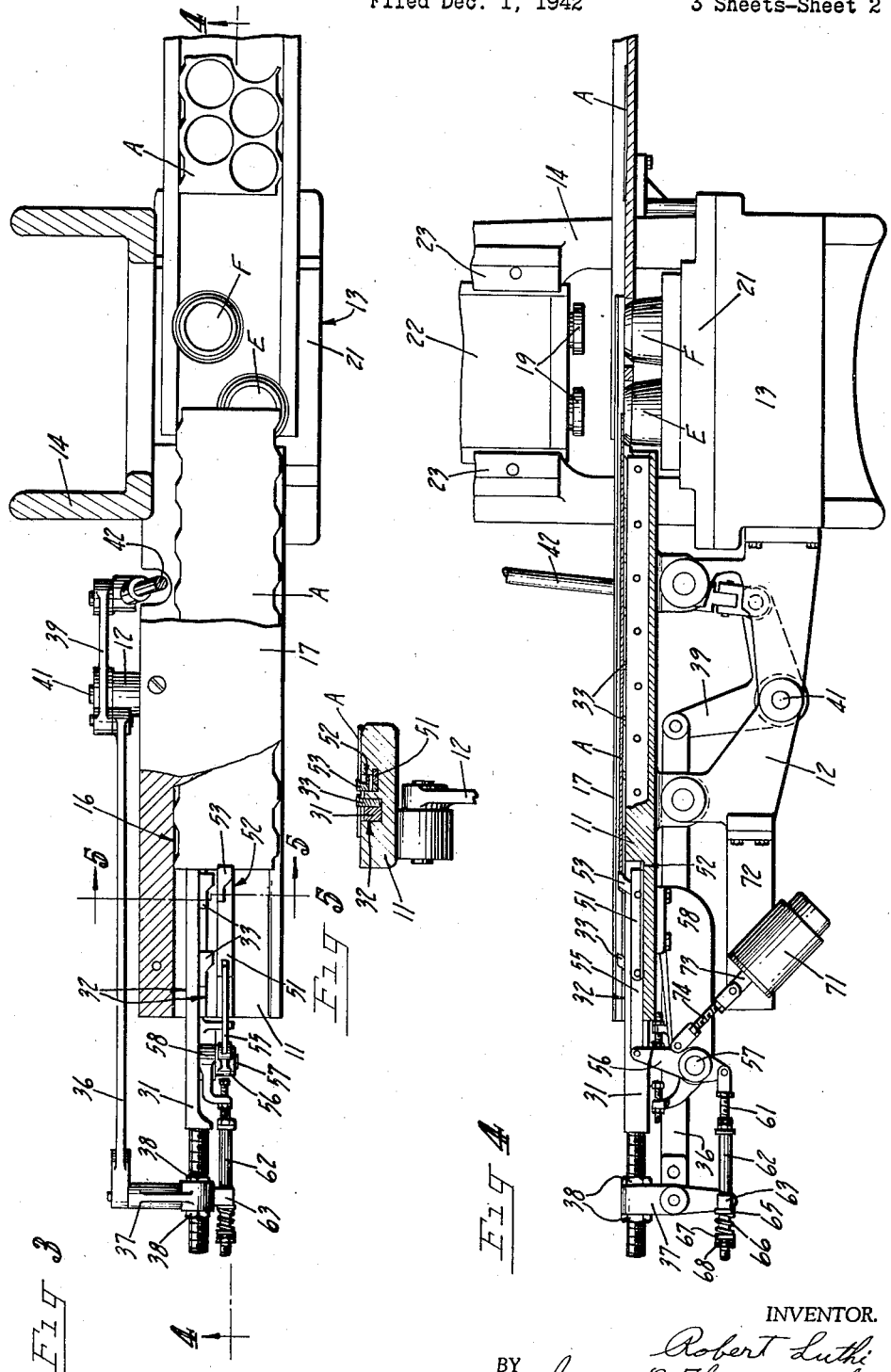

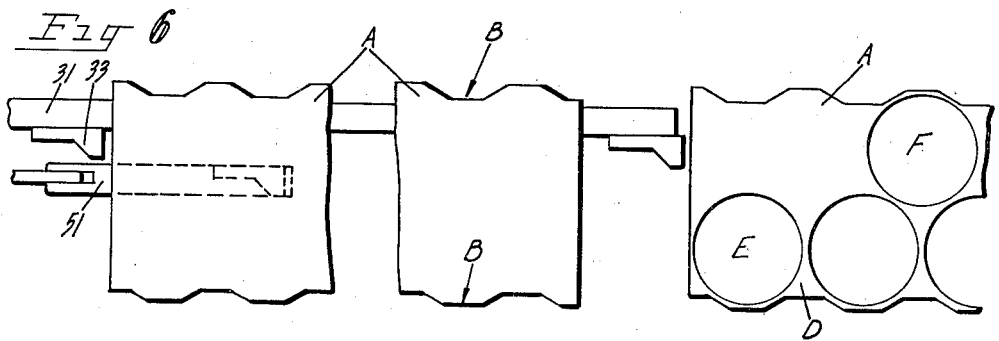
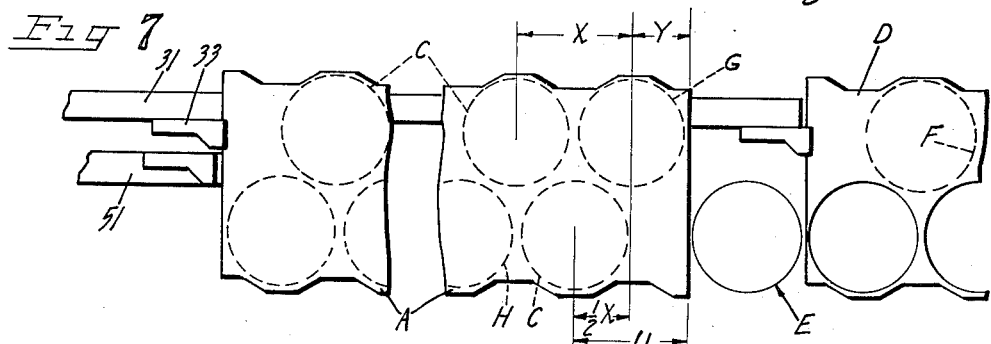
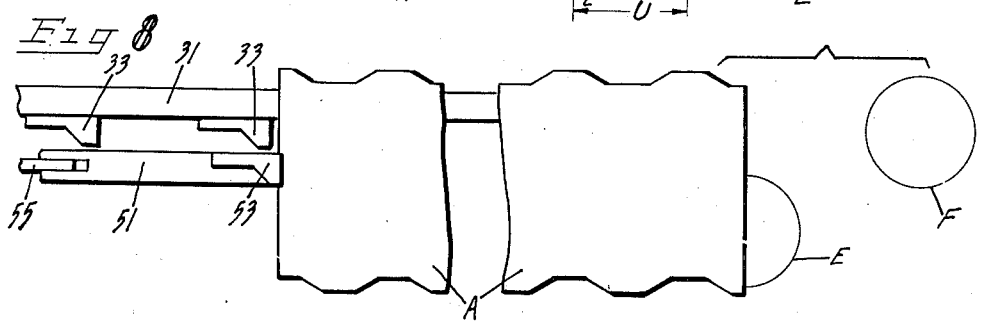
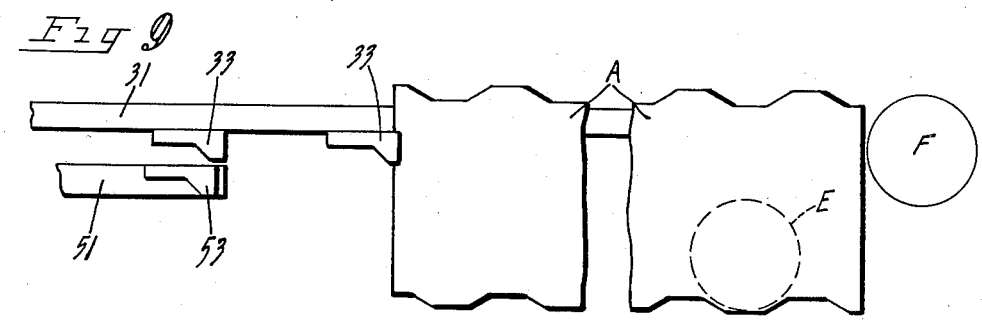

Patented Mar. 13, 1945

2,371,177

UNITED STATES PATENT OFFICE 2,371,177

FEEDING DEVICE

Robert Luthi, Forest Park, Ill., assignor to American Can Company, New York, N. Y., a corporation of New Jersey Application December 1, 1942, Serial No. 467,522

5 Claims. (Cl. 271—2.5)

The present invention relates to a feeding device for a container or can making machine in which container parts are produced from sheets or strips having the container parts arranged in a multiple row staggered layout and has particular reference to feeding the strips in a continuous step-by-step fashion through a working station in the machine in a manner which compensates for the space between adjacent strips in the line and for the staggered layout of the container parts in the strips so that upon entering the working station they will be properly located for an operation to be performed thereon. This is an improvement on the feeding device disclosed in United States Patent 2,280,823, issued April 28, 1942, to J. Hansen.

In some can making machines such as for example, strip feed presses or the like in which can parts are cut from sheet metal strips by suitable die mechanism, considerable lost motion is often encountered in idle or nonproductive die movement between the feeding of strips. In most cases these strips are formed in short lengths and usually at least one or two strokes of the die mechanism are lost between each strip as they are fed one after the other into the die.

The greatest difficulty is encountered when feeding the so-called "scroll shear" strips which are usually cut from a stagger row layout sheet which gives the strips undulated side edges. In such strips the stagger layout leaves a greater amount of scrap stock at one end of the strip than at its opposite end. For "double row" strips in which two rows of can parts are cut from one strip, the can parts are arranged in a stagger layout in the strip itself and two can parts are simultaneously cut out by the die mechanism. This necessitates advancing the strip upon its initial entry into the die mechanism, through a stroke of different length in order to bring the strip into proper registration with the dies.

Hence when such "scroll shear" strips are fed endwise into the die mechanism in a continuous procession a different feeding stroke is required to bring the strip into proper position upon its initial entry into the die than is required for the remainder of the feeding strokes. It is this different stroke that compensates for the staggered layout of each strip and of adjacent strips in the procession.

The instant invention contemplates overcoming this difficulty by providing a feeding device which will compensate for this different feeding distance at the beginning of a strip feeding operation so that the strips may be fed successively into proper position into the die mechanism.

An object therefore of the invention is the provision of a strip feeding device for a can making machine wherein the strips may be fed successively into a working station of the machine while compensating for the stagger layout of the can parts in the strips and while properly locating the strips upon entering the working station for the performance of an operation thereon.

Another object is the provision of such a feeding device wherein a predetermined back or return stroke of a reciprocating feed bar is utilized during the step-by-step advancement of a strip, to advance the strip the different distance required to compensate for the stagger layout of adjacent strips and to properly locate the entering strip at the working station.

Numerous other objects and advantages of the invention will be apparent as it is better understood from the following description, which, taken in connection with the accompanying drawings, discloses a preferred embodiment thereof.

Referring to the drawings:

Fig. 3 is a transverse section taken substantially along the line 3—3 in Fig. 1, with parts broken away;

Fig. 4 is a longitudinal section taken substantially along the line 4—4 in Fig. 3, with parts broken away;

Fig. 5 is a transverse section taken substantially along the line 5—5 in Fig. 3, with parts broken away; and Figs. 6, 7, 8 and 9 are schematic plan views of two adjacent or double row strips in feeding position relative to principal parts of the device, the various views showing the difference in stroke requirement in feeding such strips.

Figure 1:
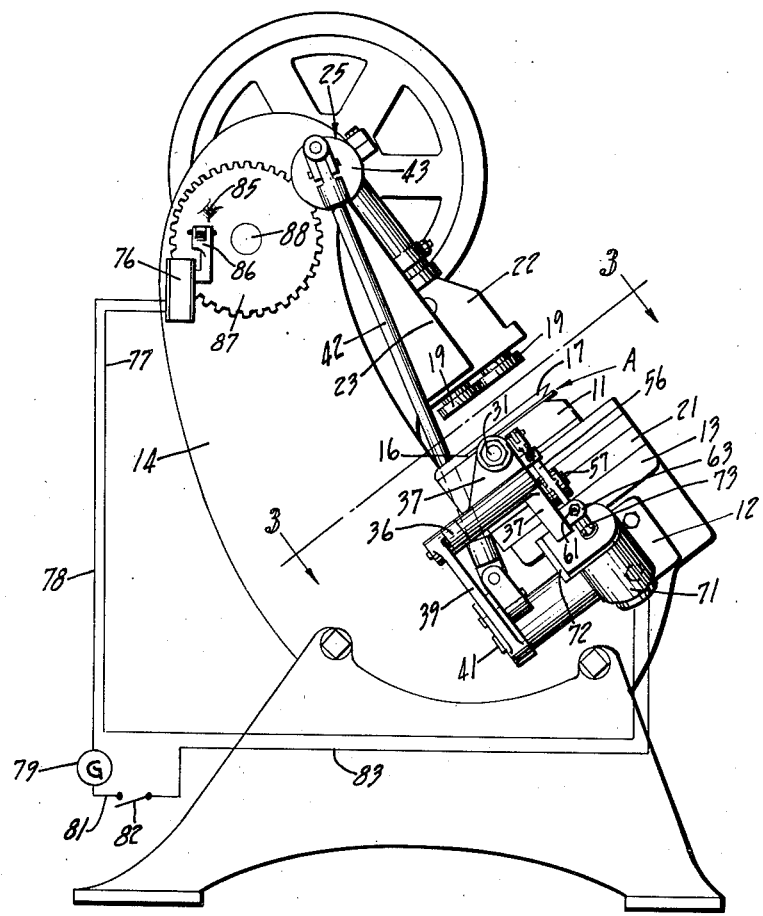
Figure 1 is a side elevation of a strip feed press having a feeding device embodying the instant invention, the view also including a wiring diagram of the electric apparatus used with the feeding device.

As a preferred embodiment of the invention the drawings illustrate principal parts of a strip feed press of the character disclosed in United States Patent 1,443,761, issued January 30, 1923, to H. Schoendelen. In such a machine can parts, such as can ends and the like are cut and formed from "scroll shear" strips A of sheet metal.

These strips are preferably cut from larger sheets in which the can parts to be formed are laid out in stagger row fashion. The strips are cut along lines of severance which extend between one or more of the stagger rows and hence result in undulated side edges B. In the present case the drawings show a "double row" strip in which there are two rows of potential can part areas in each strip, the potential can part areas being arranged in staggered order as best shown in Fig. 7.

The potential can part areas indicated by the letter C in Fig. 7 are equally spaced throughout the length of the strip and the center distance between such part areas is marked X. However, the lower (i. e., lower as to Figs. 6 to 9, inclusive) row of potential can part areas, as viewed in Fig. 7, is staggered or offset in relation to the upper row by a distance equal to one half X so that the can parts may be most economically cut from the strip. Such a cutting of the strip leaves a scrap skeleton D (Fig. 6) with the least amount of waste material.

In cutting the can parts from the strip one can part is cut from each row, the two can parts being cut simultaneously. This is usually effected by a die mechanism having two diagonally spaced dies E, F (Fig. 8). Due to mechanical obstructions, such as the required thicknesses of the die walls and other protuberances, it is impossible to arrange these two dies E, F so that diagonally adjacent can parts can be cut from the strip simultaneously.

For best results this necessitates the spacing apart of the dies a longitudinal distance equal to one and one half times X which permits of the cutting of one can part from the upper row and another can part in the lower row one and one-half times the longitudinal distance X from the one in the upper row. By way of illustration the positions of these two can part areas are indicated by dotted lines lettered G and H in Fig. 7.

The first can part to be cut from a strip upon its entrance into the die mechanism is the first or forward can part area in the lower row of the strip while the last cut made on each strip takes out the last or rear can part area in the upper row as the strip leaves the die mechanism, the work moving toward the right. It will be understood that the terms "upper" and "lower" rows are relative only as they appear in Figs. 6 to 9, inclusive, and do not designate an upper or lower position in the machine.

Thus, due to this stagger layout, the center of the first can part area C in the lower row of a strip A, is spaced inwardly from the front edge of the strip a distance U which is a greater distance than the distance (marked Y) the center of the first can part space in the upper row is spaced inwardly from the front edge of the strip. The difference between these distances is substantially equal to the amount of offset between the lower and the upper rows of can part areas, i. e., approximately one-half of X. This same relation in reverse exists at the rear end of the strip.

In feeding double row strips through the die mechanism in a step-by-step fashion the distance the strip is advanced on each step is equal to the center distance X between the potential can part spaces or areas C in one row of the strip. When the two offset rows in the strip are cut out simultaneously and the longitudinal distance between the centers of the dies E, F is equal to one and one half X, the one half X difference between these two distances must be compensated for as a strip enters the die mechanism to properly located the scroll edge of the strip and the location of the potential can part area relative to the dies E, F. It is to this feature that the invention is particularly directed.

It will be understood that the space for the feeding elements between the back edge of one strip and the front edge of a following strip being fed through the die mechanism, in end to end relation, permits of the required extra advancement of the following strip as the latter enters the die mechanism. When single row strips are fed through the apparatus, the instant invention is equally well adapted for advancing the strips a distance sufficient to compensate for the space between them so that any otherwise lost strokes of the die mechanism will be eliminated.

In the strip feed press and feed shown in the drawings, the strips A are supported on top of a table 11 (Figs. 1, 3, 4 and 5) which is secured to a bracket 12 bolted to a bed 13 of a frame 14 which constitutes the main frame of the strip feed press. Many of the press parts are inclined as shown so that a guide 16 formed along one edge of the table and constituting a track on which the strip rests, retains the strip for longitudinal movement. At the same time a top plate 17 secured to the guide prevents vertical displacement of the strip. The strips are placed upon the table in any suitable manner in time with the moving parts of the press, such as disclosed in the above mentioned Schoendelen patent.

The dies E, F of the die mechanism are located at one end of the table 11 (at the right as viewed in Figs. 3 and 4). This die mechanism may be of any suitable conventional form such as one adapted to cut and draw can parts C, for example can ends, from the strips A, as the latter are fed into proper position.

By way of example, the die mechanism includes the two dies E, F which are stationary and two cooperating punch members 19 which are movable from above into and out of the dies. The dies are secured preferably to a bed plate 21 which is bolted to the bed of the press. The punch members are secured preferably to an inclined vertical slide 22 which operates in slideways 23 formed in the press frame 14. The slide is reciprocated in the usual manner in time with the other moving parts of the machine by way of connection with a drive shaft 25 which is journaled in bearings formed in the press frame. The shaft may be rotated in any suitable manner.

The strips are fed along the table 11 and are positioned between the die members for the can end cutting and forming operation, in a step-by-step or intermittent movement. For this purpose there is provided a feeding device which includes a longitudinally reciprocable main feed bar 31 which slides in a groove 32 formed in the table 11 longitudinally thereof. The feed bar carries a plurality of spring held feed fingers 33 which are spaced apart at equal intervals along the bar and which may be depressed below the strip when the feed bar moves through a backward or return stroke. These intervals are equal to the distance X (Fig. 7) between the centers of the potential can parts or ends C in the strips A to be fed. The fingers are disposed in the groove 32 alongside of the bar and move with it within the groove.

The main feed bar 31 is reciprocated by way of a link 36 (Figs. 3 and 4) the outer end of which is connected to an arm 37 adjusted in position and carried on the outer end of the feed bar. The arm is held in the desired position by locknuts 38 threaded onto the end of the bar. The inner end of the link is connected to one arm of a bell crank lever 39 mounted on a pivot pin 41 carried in the feed support bracket 12. The bell crank lever is connected through a second arm to the lower end of an actuating rod 42 which extends up toward the top of the press and is attached to an eccentric disc 43 mounted on the outer end of the main drive shaft 25 of the press. It is this drive connection that actuates the main feed bar 31 in time with the other moving parts of the press.

When a strip A is placed upon the table 11 for feeding through the machine it depresses all of the fingers 33 with which it engages. It is placed in front of the rear or outermost finger, as shown in Fig. 6, and this finger is not depressed. When the feed bar moves forward through a feeding stroke this rear or outer finger engages behind the rear edge of the strip and advances it through a single step bringing the strip into the position shown in Fig. 7. This does not advance the strip far enough to be acted on but merely brings its forward edge closely adjacent the die E of the die mechanism.

During this same forward stroke of the feed bar, its innermost or front finger 33 engages against the back edge of the preceding strip A already positioned in the die mechanism and advances it from the position shown in Fig. 6 to that shown in Fig. 7. This new position of the preceding strip is the one in which the last can end space is disposed over the die F.

On the back or return stroke of the main feed bar 31 both advanced strips remain stationary for a part of the movement and the depressed feed fingers 33 pass under the strips. During this return stroke of the feed bar the last can end in the forward strip is blanked out and formed by the die F but die E passes into the space between the strips without performing any operation. After this operation, the scrap skeleton of the forward strip is ejected from the press by a suitable ejector device such as is usual in the present type of presses. This ejection preferably takes place immediately after the punch and die have performed their work.

It is near the end of the first return stroke of the feed bar 31 that the rear or succeeding strip is again advanced through a short stroke which is substantially equal to one-half of the distance X. This compensates for the difference between the dimensions U and Y hereinbefore mentioned as incident to the staggered layout of can part areas and the resulting spacing inwardly from the leading edge of the strip.

This return feed bar and short stroke advancement of the strip, brings its forward edge into partial position over the die E, as shown in Fig. 8. The short stroke shifting of the strip into this position takes place while the punch elements 19 of the die mechanism are traveling through an up-stroke.

The return feed stroke with its attendant short stroke advancement of the strip is brought about by an auxiliary feed bar 51 (Figs. 3, 4, 5 and 8) which is located alongside of the main feed bar 31 and is in spaced and parallel relation therewith. The auxiliary feed bar 51 slides in a groove 52 formed in the table 11 and carries a depressible spring held feed finger or dog 53.

Figure 2:
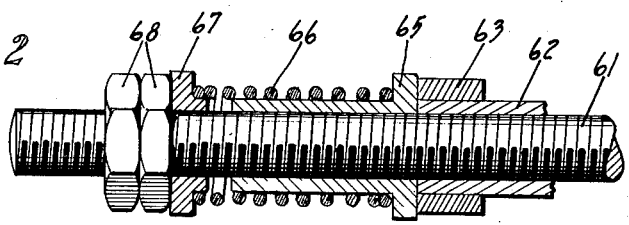
Fig. 2 is an enlarged sectional detail of the feeding device, with parts broken away.

The outer or rear end of the auxiliary feed bar 51 is connected by a link 55 to the upper end of an upright lever 56 which is mounted on a pivot pin 57 carried in a bracket 58 bolted to the bottom of the table 11. The lower end of the lever is connected to a slide rod 61 which carries a slide sleeve 62 (see also Fig. 2) on which a spring pressed sliding element 63 operates. The said sliding element is secured to the lower end of the arm 37 which, it will be recalled, is movable with the main feed bar 31.

The outer end of the slide rod 61 carries a yieldable, tubular, actuating shoe 65 which is held in place against the outer end of the slide sleeve 62 by a compression spring 66 which surrounds the shoe. The outer end of the spring is held in place by a washer 67 which engages against a pair of locknuts 68 threaded onto the slide rod. The nuts are adjustable to regulate the pressure of the spring 66.

In normal position, the auxiliary feed bar 51 rests in the forward end of its groove 52, as shown in Fig. 4. In this position, the slide rod 61 is so disposed that the actuating shoe 65 is just beyond the reach of the sliding element 63 when it is in its rearmost position, so that the sliding element is disposed to move along the rod with movement of the main feed bar 31 without any effect on the rod or on the auxiliary feed bar which it actuates.

Just prior to the first return stroke of the main feed bar 31, the auxiliary feed bar 51 is shifted or moved rearwardly and is not in its normal position. Accordingly at the time of this first rearward stroke of the feed bar, the auxiliary feed dog 53 is just in back of the rear edge of the strip (Fig. 7) and the slide rod 61 is disposed forwardly so that the actuating shoe 65 is in the path of travel of the sliding element on the return stroke of the main feed bar.

The shifting of the auxiliary feed bar 51 out of its normal position and the shifting of the slide rod 61 into such position is brought about by a solenoid 71 (Fig. 4) which is secured to an extension 72 of the feed support bracket 12. The solenoid is formed with a freely movable core 73 which is not under compression of a spring housed within the solenoid as is usual in such solenoids. The outer end of the core is connected by a link 74 to the auxiliary feed bar lever 56 as shown in Fig. 4.

The solenoid 71 is maintained normally in a deenergized condition. It is energized by the closing of a normally open toggle switch 76 (Fig. 1) which is secured to the side of the press frame 14. One side of the switch is connected by a wire 77 with the solenoid. The opposite side of the switch is connected by a wire 78 to a generator 79 which constitutes the main source of electric energy. The generator is connected by a wire 81 to a manually operated service switch 82, which switch is connected by a wire 83 to the solenoid.

Closing of the toggle switch 76 is effected in time with the feeding of the strips A, by an operating lug 85 which is engageable against a movable element 86 of the switch 76. The lug is formed on the side of a gear 87 mounted on a short shaft 88 journaled in a suitable bearing formed in the press frame 14. The gear meshes with and is rotated by a pinion which is carried on the main drive shaft 25 adjacent the eccentric disc 43. The gear ratio is such as to cause one complete rotation of the gear 87 for each feeding cycle of a single strip.

Hence the switch parts are so timed that just prior to the first return stroke of the main feed bar 31, the lug 85 engages against the movable element 86 of the switch 76 and thus closes the switch. When this switch 76 and the service switch 82 are both closed, the solenoid circuit is established. Hence electric energy from the generator 79 flows along the circuit and through the solenoid and thus energizes the solenoid.

The energizing of the solenoid is of momentary duration since the lug passes beyond the switch element and thus permits the switch to open again but it is of sufficient duration to propel the core 73 outwardly and thus shift the auxiliary feed bar 51 into operative position as mentioned above. The feed bar and the solenoid core remain in this shifted position when the solenoid is deenergized by the opening of the switch 76.

With the auxiliary feed bar 51 in this shifted position, the sliding element 63 upon completion of the return stroke of the main feed bar 31, engages the actuating shoe 65 on the slide rod 61 and thus draws the slide rod rearwardly with the feed bar. This rocks the lever 56 and hence again pushes the auxiliary feed bar 51 forward in its groove 52 into its normal position. Such a forward movement of the auxiliary feed bar brings its feed dog 53 into engagement with the rear edge of the strip A and pushes the strip forward the required distance to make up the difference between the strip dimensions U and Y. This operation is performed while the main feed bar 31 is moving back through its first return stroke. The spring 66 adjacent the actuating shoe 65 provides a yielding engagement of the feed dog against the strip and thus prevents nicking of the strip. This movement of the strip serves to advance its forward end into the position shown in Fig. 8. The forward movement of the auxiliary feed bar also returns the solenoid core 73 to its original position within the solenoid.

As soon as the main feed bar 31 reaches the outer limit or end of its first return stroke, its second feed finger 33 snaps up in back of the strip and the bar immediately moves forward on its second forward stroke. This second stroke of the main feed bar advances the single strip further into the die mechanism and into the position shown in Fig. 9 and properly locates the forward end of the strip over the die E in readiness for the first cutting and forming operation for the new strip. Only one can end C is cut from the strip while it is in this position and the die F does no work for that stroke.

During this second forward stroke and through all of the remaining strokes of the main feed bar 31, the auxiliary feed bar 51 remains at rest in normal position in its groove 52. The actuating shoe 65 on the slide rod 61 also remains in its outwardly shifted position where it is out of the path of travel of the slider 63 on the main feed bar 31. Hence there is only one forward stroke of the auxiliary feed bar for each strip A and this is effected on the first return stroke of the main feed bar for a new strip.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a device for feeding strips of sheet material in a continuous procession along a predetermined path of travel to position successive portions of the strip at a working station, the combination of a main feed bar reciprocable through a feeding stroke and a return stroke, means on said feed bar for successively engaging behind the feeding edge of the strip to advance the strip in a step-by-step manner, and means connected to said feed bar and rendered effective by the bar on its return stroke for engaging the feeding edge of the strip to advance the strip an increased forward distance as it initially enters the working station to locate the leading edge of the strip in a predetermined position for operation thereon at the working station.

2. In a device for feeding strips of sheet material in a continuous procession along a predetermined path of travel to position successive portions of the strip at a working station, the combination of a main feed bar reciprocable through a feeding stroke and a return stroke, a plurality of feed dogs spaced at equal intervals along said feed bar for successively engaging behind the rear edge of the strip to advance the strip in a step-by-step manner, an auxiliary feed bar freely slidable adjacent said main feed bar, a feed dog mounted on said auxiliary feed bar, and means movable with said main feed bar on a return stroke for shifting said auxiliary feed bar to bring its feed dog into engagement with the feeding edge of the strip and to advance the strip an extra distance as it initially enters the working station to locate its leading end portion in a predetermined position at the working station.

3. In a device for feeding strips of sheet material in a continuous procession along a predetermined path of travel to position successive portions of the strip at a working station, the combination of a main feed bar reciprocable through a feeding stroke and a return stroke, a plurality of feed dogs spaced at equal intervals along said feed bar for successively engaging behind the rear edge of the strip to advance the strip in a step-by-step manner, an auxiliary feed bar freely slidable alongside of said main feed bar, a feed dog mounted on said auxiliary feed bar, a rocker lever connecting with said auxiliary feed bar, a slide rod having an actuating head carried on said lever, and a slide member movable along said rod and mounted on said main feed bar for advancing said auxiliary feed bar during an initial strip feeding return stroke of said main feed bar to bring the auxiliary feed dog into engagement with the feeding edge of the strip and to advance the strip as it initially enters the working station to bring its leading end portion into a predetermined position at the working station.

4. In a device for feeding strips of sheet material in a continuous procession along a predetermined path of travel to position successive portions of the strip at a working station, the combination of a reciprocating main feed bar having a feeding stroke and a return stroke, a plurality of feed dogs spaced at equal intervals along said feed bar for successively engaging behind the rear edge of the strip to advance the strip in a step-by-step movement, an auxiliary feed bar mounted for free sliding movement adjacent said main feed bar, a feed dog carried by said auxiliary feed bar, means for sliding said auxiliary feed bar relative to said main feed bar to set the auxiliary feed bar in an operable position, and means movable with said main feed bar for shifting said set auxiliary feed bar to bring its feed dog into engagement with the rear edge of said strip and to further advance the strip an added distance during a return stroke of said main feed bar whereby the leading front portion of a strip initially brought into said working station is in proper position to be operated on at that station.

5. In a device for feeding strips of sheet material in a continuous procession along a predetermined path of travel to position successive portions of the strip at a working station, the combination of a reciprocating main feed bar having a feeding stroke and a return stroke, a plurality of feed dogs spaced at equal intervals along said feed bar for successively engaging behind the rear edge of the strip to advance the strip in a step-by-step movement, an auxiliary feed bar having free sliding movement adjacent said main feed bar, a feed dog carried by said auxiliary feed bar, a rocker lever connecting with said auxiliary feed bar, an electric solenoid having a movable core connecting with said rocker lever, means operable in time with the working mechanism at said working station for energizing said solenoid for sliding said auxiliary feed bar relative to said main feed bar to set the auxiliary feed bar in an operable position, a slide rod having an actuating head carried on said lever, and a slide element movable with said main feed bar and along said rod for shifting said set auxiliary feed bar to bring its feed dog into engagement with the rear edge of the strip and to further advance the strip an added distance during a return stroke of said main feed bar whereby the leading portion of a strip initially brought into said working station is in proper position to be operated on at that station.

ROBERT LUTHI.